United States Patent [19]

Tatsuno et al.

[11] Patent Number: 4,525,024

[45] Date of Patent: Jun. 25, 1985

[54] TWO-BEAM SCANNING OPTICAL SYSTEM

[75] Inventors: Kimio Tatsuno, Kokubunji; Susumu Saito, Hachioji, both of Japan

[73] Assignees: Hitachi, Ltd.; Hitachi Koki Co., Ltd., both of Tokyo, Japan

[21] Appl. No.: 438,772

[22] Filed: Nov. 3, 1982

[30] Foreign Application Priority Data

Nov. 6, 1981 [JP] Japan ............................ 56-177220

[51] Int. Cl.³ ............................................. G02B 27/17
[52] U.S. Cl. ..................................................... 350/6.5
[58] Field of Search ................ 350/6.5, 6.7, 6.8, 173, 350/174; 250/236

[56] References Cited

U.S. PATENT DOCUMENTS

| | | | |
|---|---|---|---|
| 4,002,829 | 1/1977 | Hutchison | 358/286 |
| 4,125,843 | 11/1978 | Whitby | 350/173 |
| 4,370,026 | 1/1983 | Dubroeucq et al. | 350/174 |

Primary Examiner—John K. Corbin
Assistant Examiner—Rebecca D. Gass
Attorney, Agent, or Firm—Antonelli, Terry & Wands

[57] ABSTRACT

A two-beam scanning optical system comprising two laser beams each having a polarization characteristic, a first polarization beam splitter for compounding the two laser beams into one laser beam, a rotary polygonal mirror for scanning the compounded laser beam, a second polarization beam splitter for separating the compounded laser beam into two laser beams, and a lens system for focusing the separated laser beams onto a surface of a sensitive drum of a laser printer and onto a surface of an original document to be read, respectively, so that said two separated laser beams scan the respective surfaces of the sensitive drum and the original document.

16 Claims, 1 Drawing Figure

F I G. 1
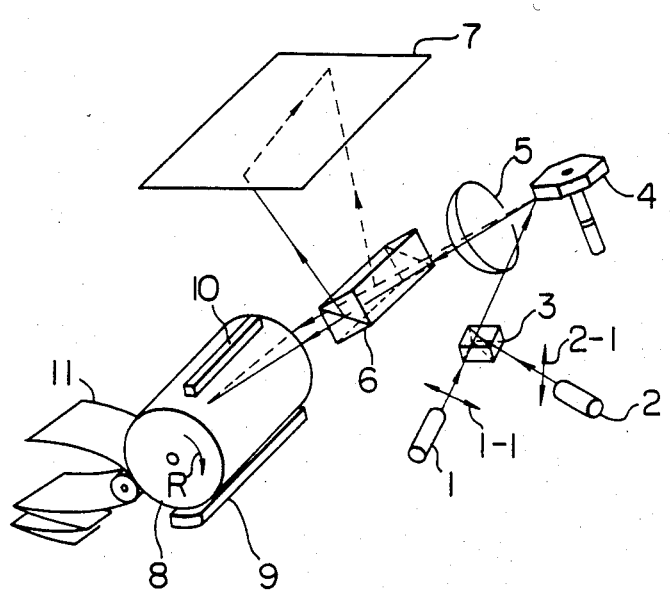

TWO-BEAM SCANNING OPTICAL SYSTEM

The present invention relates to a scanning optical system in which two laser beams can be scanned by a single optical system, and in particular to a two-beam scanning optical system in which one of the two beams is used for recording operations (for example for use in a laser printer) and the other is used for reading operations (for example for reading characters, picture images).

Recently, automating of office work has been strongly required. Especially, improvement is very necessary in efficiency of document work to be handled in offices. The work of document handling includes a work to read a document so as to input it to a file, a work to take out necessary information of the file. If these works can be made by using a single apparatus, the requirement for the improvement of efficiency of the office automation may be satisfied at a large extent.

A conventional diode laser printer, which has been developed in order to attain such a requirement for the improvement of efficiency of office automation, has a printing function as well as a document reading function in one and the same apparatus, and in order to read out a document, the image of the document is focused onto a linear sensor array so as to convert the image information into an electrical signal. However, such a linear sensor array includes about 2,000 elements at maximum at one chip and therefore the number of sampling is limited to that number of the elements. In the case where the image of document is inputted with the resolution of 100 μm, for example, the width of document to be read is limited to be 200 mm. That is, if the resolution increases the reading width becomes narrow, and, on the contrary, if the reading width is widened, the resolution decreases. To widen the reading width, it may be considered to provide several chips. In this case, however, there is a drawback that it is required to provide an illumination lamp which is so elongated and which has a higher output, in accordance with the increased number of chips. Further, since the bit transfer rate of an ordinary linear sensor array is about 3 MHz at highest, it is impossible to increase the reading speed over the bit transfer rate. Moreover, since two optical systems for the printing function and for the document reading function are separately required, there is another drawback that the whole apparatus becomes large in size.

The present invention is intended to eliminate the above-mentioned drawbacks and an object of the present invention is to provide a two-beam scanning optical system in which recording as well as reading can be made simultaneously by using a single optical system.

To attain this object, according to a feature of the present invention, a scanning means with laser beams is utilized for recording as well as reading operations.

To this end, according to the invention, the document reading function is attained in such a manner that a document is scanned by a laser beam which is condensed to be a spot of 100 μm or less on the document so that it is made possible to effect scanning with high resolution, high-speed and wide reading width, and a polygonal mirror, a galvano-mirror or a Fθ lens for use for the recording function is commonly used also for the reading function while maintaining its high resolution, so as to realize a simple optical system.

The invention will be described more in detail by referring to the appended drawing in which:

FIG. 1 is a schematic diagram illustrating the configuration of an embodiment of the present invention.

As shown in FIG. 1, in the embodiment of the two-beam scanning optical system according to the present invention, one of two beams is used for a laser printer, i.e. for recording operations, and the other for document reading operations. A first and a second diode laser 1 and 2 each having polarization characteristics are used as a light source. The first and second diode lasers are arranged such that the respective planes of polarization thereof on a first polarization beam splitter 3 are in the P and S directions respectively (In FIG. 1, arrows 1-1 and 2-1 indicates the polarization directions of the laser beams from the first and second laser sources 1 and 2, respectively.) Since the S-polarized beam is reflected and the P-polarized beam is transmitted, the two beams may be compounded into one beam. The compounded beam is scanned by a scanner 4 such as a polygonal mirror and condensed to be a spot onto a sensitive drum 8 (which rotates in the direction indicated by an arrow R in the drawing) or an original document 7, by a condenser optical system 5 utilizing an Fθ lens. At this time, the compounded beam is separated by a second polarization beam splitter 6 into two beams. The thus separated laser beams are condensed to be respective spots on the sensitive drum 8 and the document 7 so that the respective spots scan the surfaces of the sensitive drum 8 and the document 7 as shown by dotted lines thereon. In this embodiment, the S-polarized beam is reflected by each of the first and second polarization beam splitters 3 and 6 so as to be used as a beam for reading document.

Further, in FIG. 1, a developer 9, a charger 10, and the sensitive drum 8 constitute a laser printer and numeral 11 represents a sheet of recording paper.

In arrangement as mentioned above according to the present invention, the condensing and scanning of the respective beams can be effected by a single optical system constituted by a polygonal mirror, a galvano-mirror, an Fθ lens, or the like, for the laser printer function as well as for the document reading function. Further, since each of the two beams can be used on the same optical axis, the resolution is not reduced even if the two beams are scanned, and a two-beam scanning optical system can be realized which has a scanning rate and a scanning width equal to those in the case of one beam. Further, there is no reduction in efficiency of utilization of light. By utilizing such a two-beam scanning optical system as described above, a simple and compact apparatus can be realized which has a function to read numbers of documents and input the result of reading into files as well as a function to print out information from the document by a laser printer mechanism, as functions corresponding to the office work automation.

What we claim is:
1. A two-beam scanning optical system comprising:
a first laser light source for emitting a first laser beam having a polarization characteristic;
a second laser light source for emitting a second laser beam having a polarization characteristic;
a first optical means for compounding said first and second laser beams into one compounded laser beam by utilizing the respective polarization characteristics of said first and second laser beams;

a second optical means for scanning said compounded laser beam;

a third optical means for separating a laser beam emitted from said second optical means into said first and second laser beams by utilizing the respective polarization characteristics of said first and second laser beams; and a fourth optical means disposed between said second and third optical means, for collecting the laser beam from said second optical means such that said first and second laser beams respectively scan predetermined scanning planes.

2. The two-beam scanning optical system according to claim 1, wherein said first optical means is a polarization beam splitter substantially transmitting said first laser beam emitted from said first laser light source and substantially reflecting said second laser beam emitted from said second laser light source to provide said compounded laser beam, and said third optical means is a polarizaton beam splitter substantially transmitting said first laser beam in said compounded laser beam and substantially reflecting said second laser beam in said compounded laser beam to separate said compounded laser beam, whereby said first and second laser beams are compounded and separated by said polarization beam splitters.

3. The two-beam scanning optical system according to claim 2, wherein said polarization beam splitters reflect an S-polarized light and transmit a P-polarized light, one of said first and second laser light sources emitting S-polarized light and the other of said first and second laser light sources emitting P-polarized light.

4. The two-beam scanning optical system according to claim 1, wherein each of said first and second laser light sources is a diode laser.

5. The two-beam scanning optical system according to claim 1, wherein said second optical means is a polygonal mirror.

6. The two-beam scanning optical system according to claim 5, wherein said fourth optical means is an $F\theta$ lens.

7. The two-beam scanning optical system according to claim 1, wherein said fourth optical means is disposed for focusing said compounded laser beam from said second optical means along an optical axis to said third optical means.

8. The two-beam scanning optical system according to claim 7, wherein one of the predetermined scanning planes scanned by one of said first and second laser beams separated from said compounded laser beam by said third optical means lies on the optical axis of said fourth optical means.

9. An optical scanning and recording system comprising:

a first laser light source for emitting a first laser beam having a first polarizaton characteristic;

a second laser light source for emitting a second laser beam having a second polarization characteristic;

optical compounding means for compounding said first and second laser beams into one compounded laser beam by utilizing the respective polarization characteristics of said first and said second laser beams;

optical scanning means for scanning said compounded laser beam;

optical separating means for separating said compounded laser beam emitted from said optical scanning means into said first and second laser beams by utilizing the respective polarization characteristics thereof; and focusing means disposed between said optical scanning means and said optical separating means, for focusing said compounded laser beam from said optical scanning means such that said first laser beam scans a sensitive recording surface for enabling a laser printing and said second laser beam scans an object for enabling a laser reading of an image of said object.

10. The optical scanning and recording system according to claim 9, wherein said optical compounding means is a polarization beam splitter substantially transmitting said first laser beam emitted from said first laser light source and substantially reflecting said second laser beam emitted from said second laser light source, and said second optical means is a polarization beam splitter substantially transmitting said first laser beam in said compounded laser beam and substantially reflecting said second laser beam in said compounded laser beam, whereby said first and second laser beams are compounded and separated by said polarization beam splitters.

11. The optical scanning and recording system according to claim 10, wherein said polarization beam splitters reflect an S-polarized light and transmit a P-polarized light, one of said first and second light sources emitting S-polarized light and the other of said first and second light sources emitting P-polarized light.

12. The optical scanning and recording system according to claim 9, wherein each of said first and second laser light sources is a diode laser.

13. The optical scanning and recording system according to claim 9, wherein said optical scanning means is a polygonal mirror.

14. The optical scanning and recording system according to claim 13, wherein said focusing means is an $F\theta$ lens.

15. The optical scanning and recording system according to claim 9, wherein said focusing means is disposed for focusing said compounded laser beam from said optical scanning means along an optical axis to said optical separating means.

16. The optical scanning and recording system according to claim 15, wherein one of the sensitive recording surface and the object lie on the optical axis of said focusing means.

* * * * *